Figure 1:
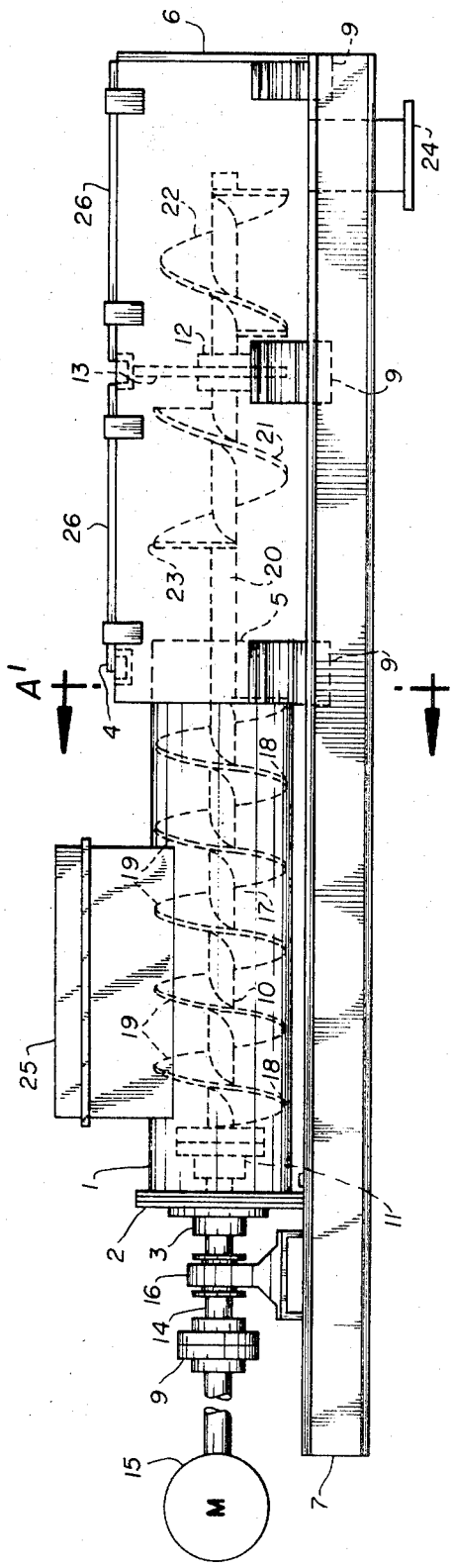

United States Patent

[11] 3,593,844

| [72] | Inventors | John W. Barclay<br>Green River, Wyo.;<br>Francis R. Evans, Jordan, N.Y. |
|---|---|---|
| [21] | Appl. No. | 872,626 |
| [22] | Filed | Oct. 30, 1969 |
| [45] | Patented | July 20, 1971 |
| [73] | Assignee | Allied Chemical Corporation<br>New York, N.Y. |

[54] CONVEYOR
10 Claims, 2 Drawing Figs.

| [52] | U.S. Cl. | 198/214 |
|---|---|---|
| [51] | Int. Cl. | B65g 33/00 |
| [50] | Field of Search | 198/214, 217; 222/412, 413 |

[56] References Cited
UNITED STATES PATENTS

| 3,464,539 | 9/1969 | Kelly | 198/214 |
|---|---|---|---|
| 3,508,683 | 4/1970 | Van Der Schee | 198/214 X |

*Primary Examiner*—Evon C. Blunk
*Assistant Examiner*—Douglas D. Watts
*Attorneys*—Albert L. Gazzola and Gerard P. Rooney ABSTRACT: A conveyor for moving solids comprising an elongated shell mounted in a horizontal position, said shell being divided in two distinct shell sections, the first section having a shell diameter less than the second section, inlet means in said first shell section, and outlet means in said second section, a helical flight assembly on a shaft rotatably and coaxially mounted within said shell, means for rotating said shaft about its major axis, said flights in the first shell section having a pitch equal to about one-half the diameter of said flight in said first shell section and said flights in the second shell section having a pitch equal to about the diameter of said flight in said second shell section, said first and second shell sections having a flightless section therein on said rotating shaft, said flightless section beginning within said first shell section and continuing into and terminating in said second shell section, said second set of helical flights having its leading edge out of phase of the trailing edge of said first set of helical flights.

PATENTED JUL 20 1971

3,593,844

INVENTORS:
JOHN W. BARCLAY
FRANCIS R. EVANS

BY *Edward P. Rooney*

ATTORNEY

CONVEYOR

This invention relates to conveyors and is directed more particularly to screw conveyors adapted to transport powdered or granular solids from a feed port to a discharge port while preventing the passage of gas either countercurrent or cocurrent to the direction of the flow of the transported material.

In the past it has been the practice when the sealing of a screw conveyor against the passage of gas has been required, to effect such seal by producing a plug of the transported material within the shell of the conveyor, or by using an unsealed conveyor in conjunction with a sealed feeder such as a rotary vane feeder. Disadvantages of such prior art apparatus include inadequate sealing, inability to operate satisfactorily when the temperature of the transported solid varies appreciably, and inability to transfer oversize material without frequent repairs and adjustments.

Accordingly, it is a primary object of this invention to provide a modified screw conveyor which is capable of transporting powdered or granular material and oversized solids and produce a plug of this material within its shell, thus providing a seal against the flow of gas.

It is a further object of this invention to provide a modified screw conveyor, designed to retain alignment of the flight assembly within its shell, irrespective of variations in the temperature of the transported materials.

It is also an object of this invention to provide a modified screw conveyor which in operation will not produce to an appreciable extent, unbalanced forces to distort the drive shaft and flight assembly, or induce uneven torque in the driving means. As a result of the modifications which comprise the invention, a smooth running, essentially trouble-free conveying apparatus is provided.

These and other objects are accomplished according to our invention by providing an elongated shell mounted in a horizontal position, said shell comprising two sections, a cylindrical fore section and a rear section of larger diameter with an inlet port in the first section and a discharge port in the second section. A shaft rotatably and coaxially mounted within said shell is provided with a flight assembly fixed thereon consisting of helices, said flight assembly comprising a first set of helical flights in said first shell section and a second set of helical flights within said second shell section. The first set of flights is located below the inlet port to the conveyor. The flights in the first shell section have a pitch (distance between the apexes of adjoining turns) equal to about one-half the diameter of the flight in said first shell section and terminate at a point near the discharge end of the first shell section. Preferably, the first flight section terminates at a point at least six inches prior to the end of the first shell section.

In the apparatus of the present invention the helical flights within the first shell section extend from below the feed port to within a short distance of the end of the first shell section. The first shell section can be flush with the second shell section, but preferably the first shell section telescopes or extends into the second shell section. Also, the inner turns of the first flight section preferably have a smaller diameter than the diameter of the turns at the ends of the flight section. This difference should not be too great as to cause an undesirably large sealing pile under the inlet. It has been found that a difference in diameter of about one inch for the inner turns is satisfactory. The length of the section of inner turns having a decreased diameter is preferably equal to the length of the feed inlet.

There is a flightless length of shaft between the first and second flight which begins within the first shell section and extends into and terminates within the second shell section. As mentioned above, the flightless section begins at a point in the first shell section and continues into the second shell section preferably to a distance equal to the diameter of the flight in said second shell section. In this flightless section of the conveyor the solids being transferred by the first flight section to this point forms a seal at the end of the first shell section which extends into the flightless section of the second shell section. Since the second shell section has a larger diameter than the first shell section the solids pile up and form a seal, thus effectively preventing any flow of gas either countercurrent or cocurrent to the flow of solids. While the flightless section preferably has a length of that described above, the flightless section can be of any desired length depending upon the solids transported so long as the solids accumulate and effectively block any passage of gas back through the flight sections.

An important feature of this conveyor is the finding that the leading edge of the second flight section should be set out of phase from the trailing edge of the first flight section. This angle will vary depending whether the flight assemblies are either single or double flights. If the flights are single units the angle is 180°, i.e. the leading edge of the second flight section is 180° out of phase from the trailing edge of the first flight section. However, if the flight assembly comprises double flight units the angle is 90° between the leading edges of the second flight section and the trailing edges of the first flight section. While some small variation can be tolerated in the above angles, an increase in deviation results in a heavier drive and shaft being required to offset the deviation. The flight edges are positioned out of phase to equalize the torque on the drive motor thereby preventing distortion of the drive shaft with off center forces. The leading edge of the second flight section cuts into the toe of the solids which have accumulated in the flightless section and conveys them through the second flight section. As the solids are removed from the bottom portion of the accumulated solids additional solids move and replace the removed solids which in turn permit a continuous movement of the solids while maintaining the gas seal. The speed of rotation is regulated according to the amount of solids entering the conveyor through the inlet port so that there is a constant movement of solids through the conveyor while maintaining the sealing relationship in the conveyor by the accumulated solids in the flightless section. Even if there is an interruption in the flow of solids into the conveyor the seal established by the accumulation of solids in the flightless section is maintained.

The conveyor of the present invention is described in more detail in the following description of the construction and arrangement of the elements with reference to the accompanying drawings.

FIG. 1 of the drawing shows a cutaway side view of the conveyor.

Figure 2:
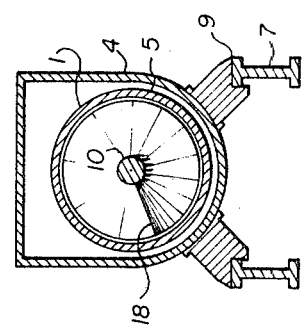

FIG. 2 of the drawing shows a section of the conveyor taken at line A—A¹ of FIG. 1.

As shown in FIG. 1, the first shell section, 1, of the conveyor which is closed at the front end with plate 2 and having a central opening which is fitted with a seal to accommodate drive shaft, 3, to which is connected flight shaft 10 by coupling 11.

The shaft at the front end of the flight assembly passes through a concentric seal in an end plate and is rotatably supported by an outboard bearing. At the discharge end, the shaft is supported at a point between the second and third flight assembly by an inboard bearing hanging within the shell. The entire conveyor assembly is slideably mounted on parallel beams, being anchored to the beams at the front end only.

A length of shaft, 14, which is coupled with driving means 15, is rotatably supported and held in axial alignment with the drive shaft 3, by the radial and thrust bearing, 16, connected and aligned with the flight shaft, 10, by coupling 11 so that all expansion when hot solids are being transported is toward the discharge end.

Two beams, shown as 7, support the conveyor assembly. The front end of the conveyor is attached to both beams at anchor point 8. The balance of the conveyor assembly is slideably mounted on the beams, with bearing points being shown as 9. The inlet or feed port 25 is positioned over the forward portion of the first flight, 17.

The second section of the conveyor shell is shown as 4. The smaller diameter first shell section, 1, telescopes into the second shell section a short distance indicated as 5. The end of the rear shell section is closed by end plate 6. The conveyor outlet or discharge port is shown as 24. Two covers (26) permit ready access to the second shell section of the conveyor. The closing edges of these are baffled to prevent the escape of dust.

Fight shaft, 10, is attached to drive shaft 3 by coupling 11. To flight shaft 10 is fixedly mounted flight assemblies 17, 21 and 22. The coupling supports the front end of the flight assembly, the rear being rotatably supported by bearing 12, positioned by hanger 13, which in turn is attached to the top and walls of the second shell section. This bearing carries the shaft at a point between the flight assemblies 21 and 22.

The first of the flight sections, 17, rotates coaxially within the first shell section, 1, with only a slight clearance between the internal diameter of the shell and the apexes 18, of each turn in the flight except that the diameter of the central turns indicated as 19, have a slightly smaller diameter than the leading and trailing turns 18. The pitch of flight 17 is one-half the diameter of the turn 18, i.e. the distance between apexes 19 is equal to one-half the diameter of turn 18. Flight assembly 17 ends before the termination of first shell section 1. This distance preferably has been found to be at least about 6 inches from the end of the shell. As shown, the first shell section 1 telescopes into the second shell section 4.

Following first flight section, 17, there is a space or flightless section indicated as 20, the length of which is not less than the diameter of the flights. It is within this flightless section that the solid material conveyed by flight assembly 17 accumulates and seals shell 1 in telescoping area 5. The material overflows from the end of shell 1 into second shell section 4 and builds up to a point where a portion of the accumulated solids is picked up by the leading edge of flight assembly 21 indicated as 23, as it is rotated by drive shaft 3. The flow of solids continues through shell 4 and the solids are discharged via outlet 24 from the conveyor.

Flight assemblies 21 and 22 both have the same diameter as the maximum diameter of the first flight assembly. However, the distance between the apexes of the turns in these flight assemblies consists of one full pitch. Also, the leading edges of the single light assemblies 21 and 22, as shown, are set about 180° from the trailing edges of flight assemblies 17 and 21, respectively. However, if double flights, not shown, are used in the assembly, the angle is about 90°.

The apparatus described may be utilized wherever there is a need for a sealed conveyor. The embodiment illustrated has found particular adaptability for use as a conveyor for hot particulate material, such as calcined trona ore (crude sodium carbonate), leaving a direct fired calciner, where air entering at any point, except at the burner, would seriously interfere with the burner's operation.

When using the present apparatus for this purpose, hot calcined sodium carbonate ore (trona), which may be powdered or granular in form, is fed from a calciner, not shown, into inlet 25 in first shell section 1, whereupon it falls into rotating half pitch flight assembly 17. The flight moves the trona along the shell. Since the leading turn 18 has less clearance in the tube than central turns, 19, which are of smaller diameter, and are therefore less efficient causing a buildup or flooding of the shell, a plug of hot crude sodium carbonate is produced which blocks the flow of air through this portion of the conveyor shell. The last turn of the flight is as efficient as the first since it has the same diameter and clearance. This moves the hot crude sodium carbonate out of the end of the first flight assembly section into flightless sections 5 and 20. Here the calcined trona piles up, completely blocking the end of the first shell section, thereby producing a second and major seal against the flow of air into the calciner through inlet 25. As the pile of calcined trona grows, the material begins to tumble into the second full pitch flight assembly 21, and is moved on by turn 23 into full pitch flight assembly 22, which in turn transports it to the outlet port 24. From here it falls to elevators for further processing.

As the temperature of the transported solids can vary considerably, the conveyor assembly is slideably mounted on the supporting beams, 7, to permit travel (with expansion and contraction), from anchor point 8. With this arrangement the conveyor and flight assemblies remain in alignment at all working temperatures.

The flight shaft 10, centered at the feed end of the conveyor by out-bearing 16, is supported near the discharge end by internal bearing 12, which in turn is positioned by hanger 13. This arrangement has been found to contribute to the relatively trouble-free service of the seal conveyor.

We claim:

1. An apparatus for conveying solids from an inlet port to a discharge port which comprises:
   a. an elongated shell comprising two sections, a first shell section having inlet means and having a shell diameter less than the diameter of the second shell section; and said second shell section having outlet means;
   b. a helical flight assembly fixedly mounted on a common shaft rotatably and coaxially mounted within said shell, a first flight assembly section terminating within the first shell section, and a second flight assembly section within said second shell section;
   c. said first and second flight assemblies being separated by a length of flightless shafting beginning in the first shell section and extending into said second shell section;
   d. said flight assembly in said first shell section having a one-half pitch and said flight assembly in said second shell section having a full pitch;
   e. the leading edge of each successive flight assembly section set out of phase from the trailing edge of the preceding section by 90° when double flights are used and 180° when single flights are used.

2. The apparatus of claim 1, wherein said first flight assembly section has central turns having a diameter less than the diameter of the turns on either end of the assembly section.

3. The apparatus of claim 1 wherein the conveyor is slideably mounted on beams, said beams parallel to each other and to the rotating shaft of the conveyor, whereby said conveyor may expand and contract in relation to the temperature of the conveyed material to maintain the conveyor in proper alignment.

4. The apparatus of claim 1 wherein the conveyor is horizontally disposed and the flight shaft is rotatably and coaxially positioned and supported near the discharge port of the conveyor.

5. The apparatus as recited in claim 1, wherein three flight assemblies are arranged on a single flight shaft and in which the flight shaft is supported at a point between the second and third flight assemblies.

6. The apparatus of claim 1 wherein said first shell section telescopes into said second shell section.

7. The apparatus of claim 1 wherein said flightless portion within said first shell section begins at a point approximately 6 inches from the end of said first shell section.

8. The apparatus of claim 1 wherein said flightless portion within said second shell section is at least equal in length to the diameter of the flights in said section.

9. The apparatus of claim 1 wherein the flight assembly comprises single helical flights and the angle between the trailing and leading edges of said flights is 180° out of phase.

10. The apparatus of claim 1 wherein the flight assembly comprises double helical flights and the angle between the trailing and leading edges of said flights is 90° out of phase.